United States Patent [19]

Bals

[11] 4,371,442
[45] Feb. 1, 1983

[54] METHOD FOR OBTAINING DISSOLVED SUSPENDED OR CHEMICALLY BOUND SUBSTANCES FROM A LIQUID

[75] Inventor: Hans G. Bals, Glenhausen-Hailer, Fed. Rep. of Germany

[73] Assignee: Uranerzbergbau GmbH & Co. KG, Bonn, Fed. Rep. of Germany

[21] Appl. No.: 254,736

[22] Filed: Apr. 16, 1981

Related U.S. Application Data

[60] Division of Ser. No. 882,447, Mar. 1, 1978, abandoned, which is a continuation of Ser. No. 741,130, Nov. 11, 1976, abandoned.

[30] Foreign Application Priority Data

Nov. 12, 1975 [DE] Fed. Rep. of Germany ....... 2550751

[51] Int. Cl.³ ............................................. B01D 15/02
[52] U.S. Cl. .................................................. 210/661
[58] Field of Search ............... 210/268, 289, 291, 661, 210/676, 189

[56] References Cited

U.S. PATENT DOCUMENTS 2,742,381  4/1956  Weiss et al. ......................... 210/661

Primary Examiner—Ivars C. Cintins
Attorney, Agent, or Firm—Laurence R. Brown

[57] ABSTRACT

A method and apparatus for obtaining dissolved, suspended or chemically bound substances from a liquid by passing the liquid upwardly through a bed of adsorbent particles in an upwardly extending channel, the liquid flow rate being such that the particles are fluidized and the liquid flowing initially through a device providing a resistance to flow whereby the flow is stabilized and the particles move slowly within the flow through the channel.

2 Claims, 4 Drawing Figures

METHOD FOR OBTAINING DISSOLVED SUSPENDED OR CHEMICALLY BOUND SUBSTANCES FROM A LIQUID

This is a division, of application Ser. No. 882,447, filed Mar. 1, 1978, which is a continuation of Ser. No. 741,130 filed Nov. 11, 1976, both now abandoned.

This invention relates to a method of obtaining dissolved, suspended or chemically bound substances from a liquid. The invention is particularly, though not exclusively, useful for obtaining minerals, for example uranium or other heavy-metal compounds, from a liquid. It is known to pass liquid carrying desired substances in a substantially vertically ascending stream through a bed of adsorbent particles capable of adsorbing these substances.

Such a process, and apparatus for carrying it out, is suitable for example for obtaining uranium from the sea or from effluents. However, the concentration of uranium, and this applies also to other minerals, in sea water is so low that extraction on an industrial scale has not been seriously contemplated hitherto.

The known processes and apparatus, which employ beds of adsorbent granules or other particulate matter, heaped upon each other with an aqueous solution flowing between them so that ions contained in the solution are adsorbed on the surfaces of the adsorbent particles, which are wetted by the solution by reason of the active molecular forces display disadvantages. Thus, such adsorbent beds have an inherently large resistance to flow, which depends on the density and thickness of the bed. To this is added the fact that the adsorbent bed acts as a filter, which at least partly traps foreign solid matter, such as is always present in sea water, with the result that the resistance to flow increases over a period and the active surface area of the adsorbent particles is reduced. Of course, not all the surface area is available to be wetted in any case, because regions of the individual particles which lie against each other are not effective. A further disadvantage is the impossibility of carrying out a continuous process, which is a precondition for an economically viable operation.

It has, moreover, already been proposed to pass a liquid which contains low concentration of uranium in solution, up through a column sub-divided into several chambers, each chamber containing a specific amount of a particulate adsorbent. The upward-flowing solution is intended to act in such a manner that a fluidized bed of particles is formed, that is to say, the particles are in turbulent motion in the stream within each chamber, the intention being to achieve as intensive a contact as possible between the solution and the surface of the particles, in the course of which the uranium is adsorbed from the solution. The flow velocity is to be so adjusted that as far as possible the adsorbent particles are not carried upwards into the next chamber of sink down into the chamber located below. Although the application of this process makes the obtaining of uranium compounds technically achievable, it still has the disadvantage of inadequate profitability.

This can be attributed amongst other things to the fact that certain adsorbent materials erode severely, due to collision with each other, and on becoming smaller are carried out of the chambers and lost. The losses thus caused are so great that the process becomes uneconomical. In addition, with some adsorbent materials, the adsorbed substance deposits itself in a multi-molecular layer so that parts of the substance deposited may be subsequently rubbed off upon collision. This reduces the efficiency of the process to such an extent that the economics are questionable, while any possible continuous operation will require complicated technical installations and the specific energy consumption of the process is relatively high.

The aim of this invention is to provide an improved process for obtaining dissolved, suspended or chemically bound substances from a liquid.

According to one aspect of the present invention there is provided a method of obtaining dissolved, suspended or chemically bound substances, from a liquid by passing the liquid upwardly through a bed of adsorbent particles capable of receiving the substances, the bed being retained in a channel, wherein the specific gravity of the adsorbent particles is greater than that of the liquid, the flow velocity of the liquid on entry into the bed is not less than the sedimentation velocity of those particles which have the highest sedimentation velocity, and, on issuing from the bed, has a smaller effect on movement of the particles than that of the sedimentation velocity of those particles having the smallest sedimentation velocity and the liquid, prior to entering the bed, is stabilized by flowing through a device which provides a resistance to the flow which is at least about a third of the resistance to the flow provided by the bed, whereby the particles, owing to at least one of weight and consequent sedimentation velocity increase due to adsorption and to a tendency to be distributed uniformly across the channel, move slowly in a suspended state from one point to another within the channel.

In another aspect the invention provides apparatus for use in obtaining dissolved, suspended or chemically bound substances from a liquid including a generally vertically arranged channel provided for holding a bed of adsorbent particles capable of receiving the substances and a device at the bottom of the channel to stabilize the liquid flow and to provide a resistance to the flow.

In effect, the invention provides for the adsorbent particles to move only slightly relative to each other within the liquid. As a result, contacts between the individual particles and/or between the latter and the walls of the apparatus will be reduced to a minimum. Practically all known granular adsorbent substances can be used, and their full surface areas can be employed. Also, a continuous operation is envisaged, according to preferred features, in that during their presence in the liquid upon being charged, the adsorbent particles will move from an input point to a withdrawal point.

According to a preferred feature, after passing through and being stabilized by the device, of which the resistance to flow is at least approximately a third of the resistance to flow of the bed, the liquid stream is slowed down uniformly due to a cross sectional enlargement of the channel in the manner of a diffuser. The adsorbent particles, owing to the tendency to uniform distribution over the flow cross-section and/or owing to sinking due to weight increase arising from adsorption and the consequently greater relative sedimentation velocity, may be conveyed in the suspended state in a slow migratory movement from an upper point through the bed to a lower point, these points being, preferably, respectively input and withdrawal points through which particles may pass continuously. A situation is achieved wherein the adsorbent particles remain quasi-stationary within the liquid, so that the particles collide with each other, and with the walls of the channel, to a lesser extent than previously or not at all. Thus, the occurrence of abrasion capable of reducing the particle size of the adsorbent material is of reduced probability, and that which does occur will be at low velocity, while substances already adsorbed are unlikely to be rubbed off and, owing to the quasi-stationary behaviour of the individual particles a controlled movement of the bed as a whole is possible, which can be utilized to move the bed from an input point to a withdrawal point. In the course of such movement the individual particles will move with substantially equal speed and substantially parallel to each other. The movement may take place from top to bottom, that is to say, the adsorbent material is fed to the liquid from above, in which case particles will initially remain in the upper region of the bed and, in the course of the adsorption process, sink downwards as their weight increases until finally in a saturated state they reach the lower portion of the bed to be withdrawn from the adsorbent bed continuously or discontinuously through an appropriate orifice or other device. With this manner of conveying the adsorbent material through the stream it is expedient to keep the particle size of the material as uniform as possible, since otherwise the residence time in the liquid and the degree of loading of the particles would vary.

If the deposition of the substance to be obtained on the individual particles remains so low that no appreciable increase in weight results, the particles will stay in suspension within the bed at a constant height. Since in fact the specific relative sedimentation velocity of each individual particle is just compensated at a particular level of the adsorbent bed by the upward flow of the liquid, the particles arrange themselves in layers depending on the factors influencing sedimention velocity such as weight and shape of the particles, flow rate and the like. Within the layers the particle positions will not change substantially, as long as these major factors do not change. It is expedient to maintain the flow velocities of the liquid within a range which includes the velocity corresponding to the extreme values of the expected relative sedimentation velocity of the adsorbent particles. It is therefore possible without difficulty to withdraw particles of a bed at one side of a liquid stream, for instance continuously, and to feed in other particles for instance on the opposite side, again advantageously continuously. Thus, the bed formed by the particles in the stream at any one time constantly moves slowly from one point to the other. This means that the bed formed by the particles flows horizontally owing to a quantity gradient resulting from the removal of particles, in consequence of which a continuous operation becomes possible with one or more input points and one or more withdrawal points for the adsorbent particles. At the withdrawal point, the particles may be withdrawn over the entire height of the bed. However, here again it is possible to withdraw the particles only in the lower region of the bed. This will be advisable when an adsorbent material is used which, in the course of deposition of the substance to be obtained, undergoes such an increase of the relative sedimentation velocity that it sinks in counter-current to the liquid stream into deeper zones of the adsorbent bed, so that the lower layers of the bed contain the most extensively enriched particles.

The invention will be more clearly understood from the following description which is given by way of example only with reference to the accompanying drawings in which.

Figure 1:
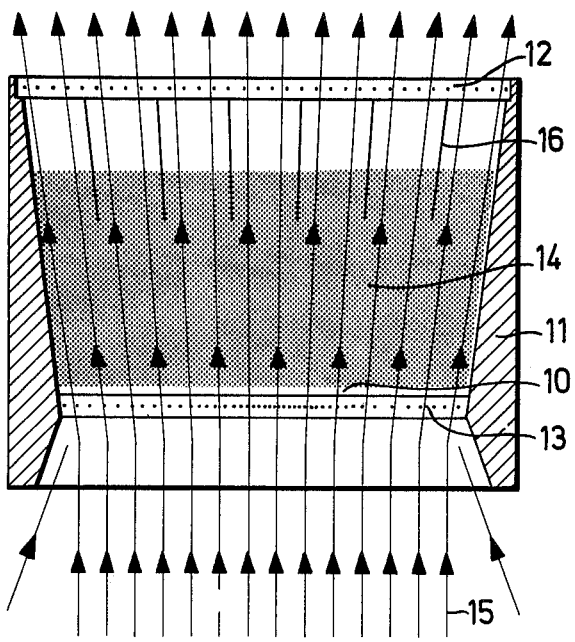
FIG. 1 shows a longitudinal section through a part of an apparatus according to the invention for obtaining substances from liquids.

The apparatus shown in FIG. 1 includes a housing 11 bounding an upwardly extending channel 10 provided at the bottom with a screen, grate, sieve or the like 13. The channel 10 increases in cross sectional area in the upward direction. A loose bed 14 of adsorbent particles is provided in the channel, the particles, during operation being held in suspension by liquid flow indicated by the arrows 15. The flow velocity of the liquid decreases within the channel 10. The adsorbent particles, the specific gravity of which is greater than that of the liquid, have, to a first approximation, a sedimentation velocity which depends on the specific gravity of the particles and of the liquid, the size and external shape of the individual particles, the distances between individual particles and the viscosity of the liquid. When the sedimentation velocity specific to each individual particle is just compensated by the upward flow of the liquid, that particle remains in suspension. Accordingly, within the upward flowing liquid stream the adsorbent particles arrange themselves approximately in layers at heights dependent on their sedimentation velocity, and do not change their position substantially in the vertical direction, as long as the factors determining sedimentation velocity do not undergo any change. Where a group of particles are close to each other they influence each others movement so that the sedimentation velocity of the group is less than that of the individual particles. In the embodiment illustrated in FIG. 1, the flow velocity of the liquid, which is greatest at the bottom and least at the top, will lie within a range which includes velocities corresponding to the extremes of the expected sedimentation velocities of the adsorbent particles, so that the top and the bottom boundaries of the bed 14 are located within the channel 10.

Figure 4:
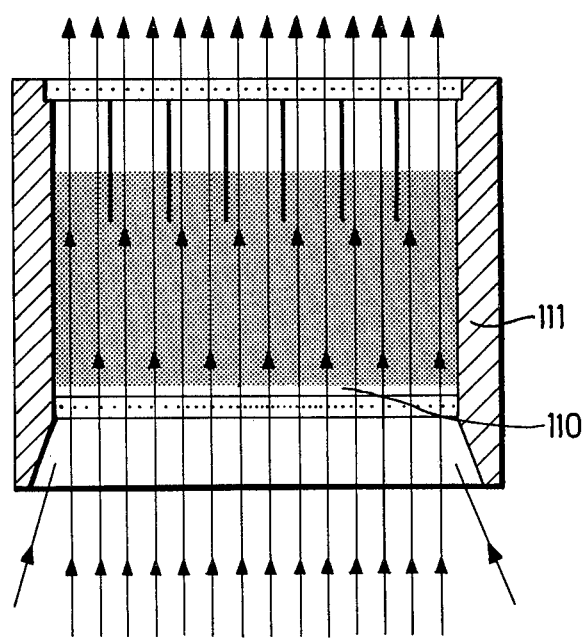
FIG. 4 is a longitudinal section, corresponding to that of FIG. 1, but of another embodiment.

The embodiment of FIG. 4 is the same as the of FIG. 1 except that the inside walls of the housing 111 which define the channel 110 are parallel to each other. A further possibility is to have a channel with a lower region bounded by parallel walls and an upper region which increases in cross sectional are in the upward direction.

The grate, sieve or the like 13 which forms the bottom boundary of the channel 10 has a specific resistance to flow, which should be at least approximately half as great as the resistance to flow of the bed 14.

The magnitude of the resistance to flow of the grate or the like determines the stability of the flow profile within the adsorbent bed. However, for reasons of conservation of energy it should be kept at a low level consistent with good flow conditions in the adsorbent bed.

If the resistance to flow of the grate varies over the surface area of the grate, then a practically complete homogenity of the flow velocity in close proximity above the grate can be achieved. The resistance to flow of the grate or the like 13 can be defined in the following manner:

$$W_{Grate} = \left( \frac{F_g}{\mu \cdot F_{free}} - 1 \right)^2 \cdot \rho \cdot \frac{U^2}{2}$$

wherein
$W_{Grate}$=the total resistant to flow of the grate, sieve or the like, 13,
$F_g$=the total grate surface area,
$F_{free}$=the sum of the areas of the apertures in the grate,
$\mu$=a factor between 0.5 and 1, which takes account of the influence of the aperture shape,
$\rho$=the specific gravity of the liquid,
U=the velocity of the flow, relative to the grate.

The resistance to flow of the suspended adsorbent bed 14, i.e. the total resistance to flow of all adsorbent particles suspended in the liquid, relative to the cross-section can be defined as;

$$W_{bed} = G - A,$$

wherein
G=the total weight of the suspended adsorbent particles,
A=the total buoyancy of the suspended adsorbent particles.

In the embodiment illustrated in FIG. 1 of the drawing, the upper end of the housing 11 delimiting the diffuser channel 10 is also provided with a sieve or the like 12 which, however, is merely intended to prevent the transport of adsorbent particles upwards out of the diffuser in the case of any unforeseeable and/or uncontrollable factors occurring. It is of course also possible to mount this sieve or the like 12 at some other location, that is to say, at a greater distance from the diffuser in a conduit for the outflowing liquid. Since, as already explained, the occurrence of appreciable abrasion and resulting erosion need not be feared, the seive 12 may have a mesh or aperture size which does not substantially increase the resistance to flow.

The channel 10 is provided with stabilizers 16, which project from above into the bed 14. The stabilizers may be constructed as for instance plates or pipes. They are intended to effect a further homogenization of the flow velocity in the diffuser channel 10 within the region of the adsorbent bed 14. Should a local increase of flow velocity occur, caused for example by accidental differences in density or differences in the overall height of the adsorbent bed, it would not be possible to exclude the possibility, in the absence of stabilizers, that the flow velocity in the other regions would fall, with the result that at these locations the adsorbent particles would sink and particles from other regions would be drawn in. The packing of the bed in these regions would then become denser, leading to increasing resistance to flow and a further fall in flow velocity. At other regions, an approximately tubular channel of increased flow velocity might form. The stabilizers subdivide the bed 14 in its upper region into sections and make it more difficult for particles to move horizontally. If an increase in flow velocity occurs at certain locations, the adsorbent bed rises in the sections thus affected. This results in an increase of the resistance to flow, owing to which the flow at these locations is slowed down and is regulated relative to the overall cross-section of the diffuser.

In the embodiment of FIG. 1, it is to be assumed that the adsorbent particles, when adequately charged with the substance to be obtained, are laterally withdrawn, in particular either over the entire height of the bed or in the lower region of the bed. In the latter case, it is expedient to use an adsorbent which, in the course of adsorption of the substance to be obtained, experiences such a weight increase that it sinks downwards within the bed. The saturated particles would be withdrawn laterally approximately at the level of the lower boundary of the bed 14.

Figure 2:
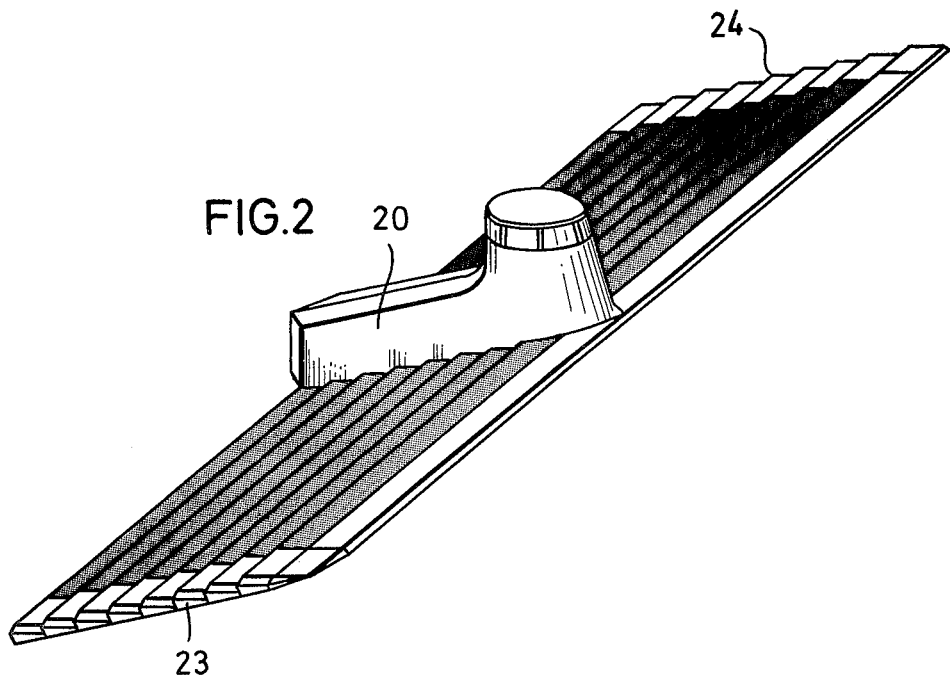
FIG. 2 is the perspective view of a ship equipped with an apparatus for obtaining substances from the sea.
Figure 3:
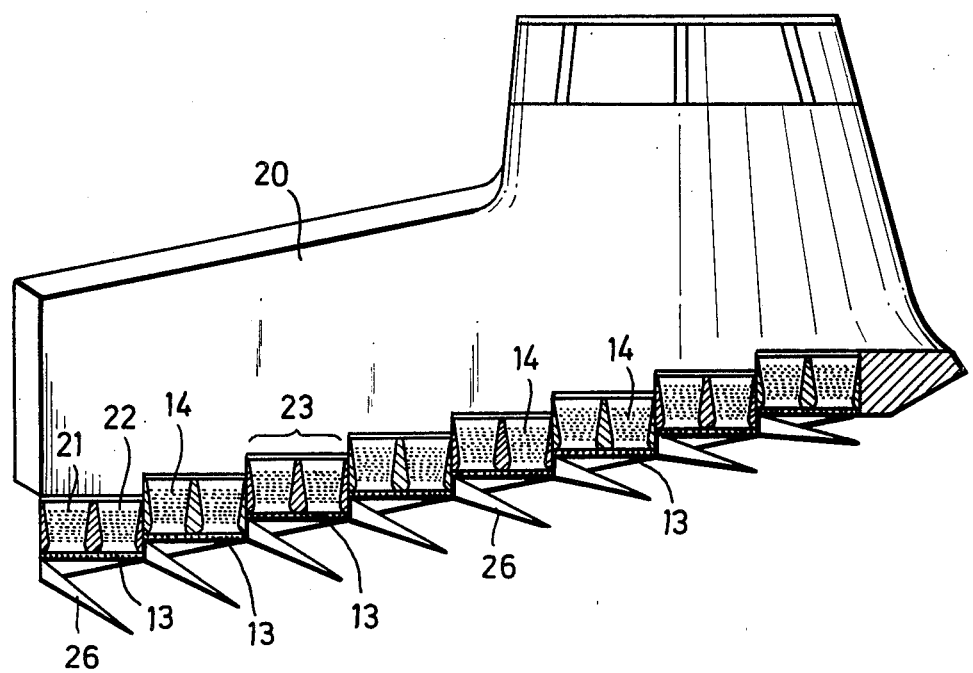
FIG. 3 is a side elevation of the ship and apparatus of FIG. 2, partly in section.

FIG. 2 shows a possible embodiment of a complete apparatus for obtaining substances from the sea. The semi-submergable ship body 20, which may be towed by a mother ship or anchored in a suitable current, for example the Florida current, carries on both sides outriggers, in which the adsorbent beds constructed as shown in FIG. 1 are arranged. As can be seen in FIG. 3, the beds may each be subdivided into an inlet bay 21 and a return bay 22. Fresh, unsaturated adsorbent material is fed continuously or discontinuously from the ship's body 20 into the inlet bay 21, whilst saturated adsorbent material is withdrawn at the same rate and/or in the same quantity from the return bay 22 into the ship's body 20. At the free ends 23 and 24 (FIG. 2) the inlet and return bays of an adsorption bed unit 23 are interconnected, so that the adsorbent material can pass from the inlet bay into the return bay. This means that the bed is preferably continuously in movement from the ship's body 20 to the end of the outrigger and back again in a substantially horizontal plane.

On the ship's body 20 guide surfaces or vanes 26, are arranged in such a manner, that one is associated with each inlet bay or each inlet orifice. These guide surfaces 26 are adjustable, so that the currents in the individual inlet bays 21 of all outriggers or on the inlet orifices of these inlet bays can be regulated.

The saturated adsorbent material is eluted in the ship's body 20 or, optionally, in a mother ship or factory ship, and is then returned to the cycle. It is also feasible to carry out the elution process in the ship's body and to integrate the device used for this purpose in a cyclic stream for the adsorbent material, which stream also comprises the previously described devices and beds.

An example of an experimental arrangement will be described below:

An experimental diffuser channel was used, which measured 300×1,500 mm at its narrowest cross-section, whilst its walls diverged upwards at an angle of 6° relative to the vertical axial direction.

A sieve, arranged in the narrowest cross-section of the diffuser, consisted of a perforated plate, the apertures of which had a diameter of 1.5 mm. The ratio of the total open area of the apertures to the total surface area of the sieve was 0.12, and apertures were provided in greater numbers per unit area of the sieve at the edges than in the centre.

Placed within the diffuser channel was a heap of adsorbent particles with a height 150 mm. The material of the particles had a specific gravity of 2.25 g/cm$^3$. The individual particles had diameters of 1 to 3 mm, the particle size distribution being approximately uniform.

Sea water then passed from below perpendicularly against the sieve.

At a water throughput rate corresponding to a flow velocity of approximately 2 cm/sec, relative to the sieve, the bed began to be fluidized. At a water throughput rate corresponding to a flow velocity of approximately 7 cm/sec, relative to the sieve, the particle bed was so dispersed that its volume increased by 40% compared with its undisturbed volume. A strong segregation of the particles according to particle size took place, in the course of which the larger particles were supported near the bottom of the diffuser channel and the smaller particles at the top. The smaller particles displayed only 1 to 3 cm variation in level within the channel while the flow was maintained.

The surface of the suspended particle bed showed slight local oscillation, but this was generally uniform over the whole width of the bed.

During the experiments, dyestuff-marked particles (approximately 10 kp) were fed in at one side of the suspended bed over a period of approximately 10 seconds. It was observed that these marked particles pushed the original particles in front of them and the particle distribution as well as the height of the bed became uniform over the entire width of the bed within a few seconds.

When, on the other side of the bed, approximately 10 kp of particles were withdrawn by suction, the uniformity of the particle distribution was again re-established very rapidly.

A horizontal migration of the particles was seen to occur substantially only during addition and/or take-off of particles, it being unnecessary to effect the input and the withdrawal simultaneously. The mixing of particles in the bed, with new particles fed in from one side proceeds very slowly.

Analyses of the particles and of the sea water passed through proved that good conditions for material transfer in a quasi-stationary suspended adsorbent particle bed prevail, since up to 90% of the heavy metals present in the water were adsorbed by the particles during passage through the latter.

What we claim is:

1. The method of obtaining chemical substances from a liquid by a bed of adsorbent particles, comprising the steps of:

establishing a bed of adsorbent particles of a specific gravity greater than that of the liquid within a container channel, flowing the liquid at a continuous steady flow rate in a path passing upwardly through the bed at a velocity chosen to suspend the particles in a quasi-stationary position within the liquid separated from each other so that the particles are wetted on their entire surfaces and do not tend to collide with each other to erode accumulated chemicals from the water, stabilizing the liquid flow to reduce turbulence in the bed and to distribute the particles substantially uniformly across the bed by providing in the liquid path before it reaches the bed a resistance to liquid flow which is at least one third of the resistance to flow established by said bed, permitting the particles in the bed to acquire chemical substances from the liquid which increase their specific gravity thereby to migrate in the liquid flow path by the action of gravity substantially due only to the accumulated chemicals as a bed without significant movement of the particles relative to each other within the liquid, thereby to reduce contact between the particles and with the container channel, and withdrawing from the bed those particles having greater specific gravity from accumulated chemicals deposited thereon from the liquid.

2. The method of claim 1 including the more specific withdrawal step of withdrawing the particles from a first side of the liquid path through the bed and further comprising the step of feeding in particles at an opposite second side of the liquid path at a rate resulting in a slow movement of particles across the bed.

* * * * *